A. W. GRUNWALDT.
GRAIN GROWING APPARATUS.
APPLICATION FILED APR. 10, 1909.
946,033.
Patented Jan. 11, 1910.
2 SHEETS—SHEET 1.
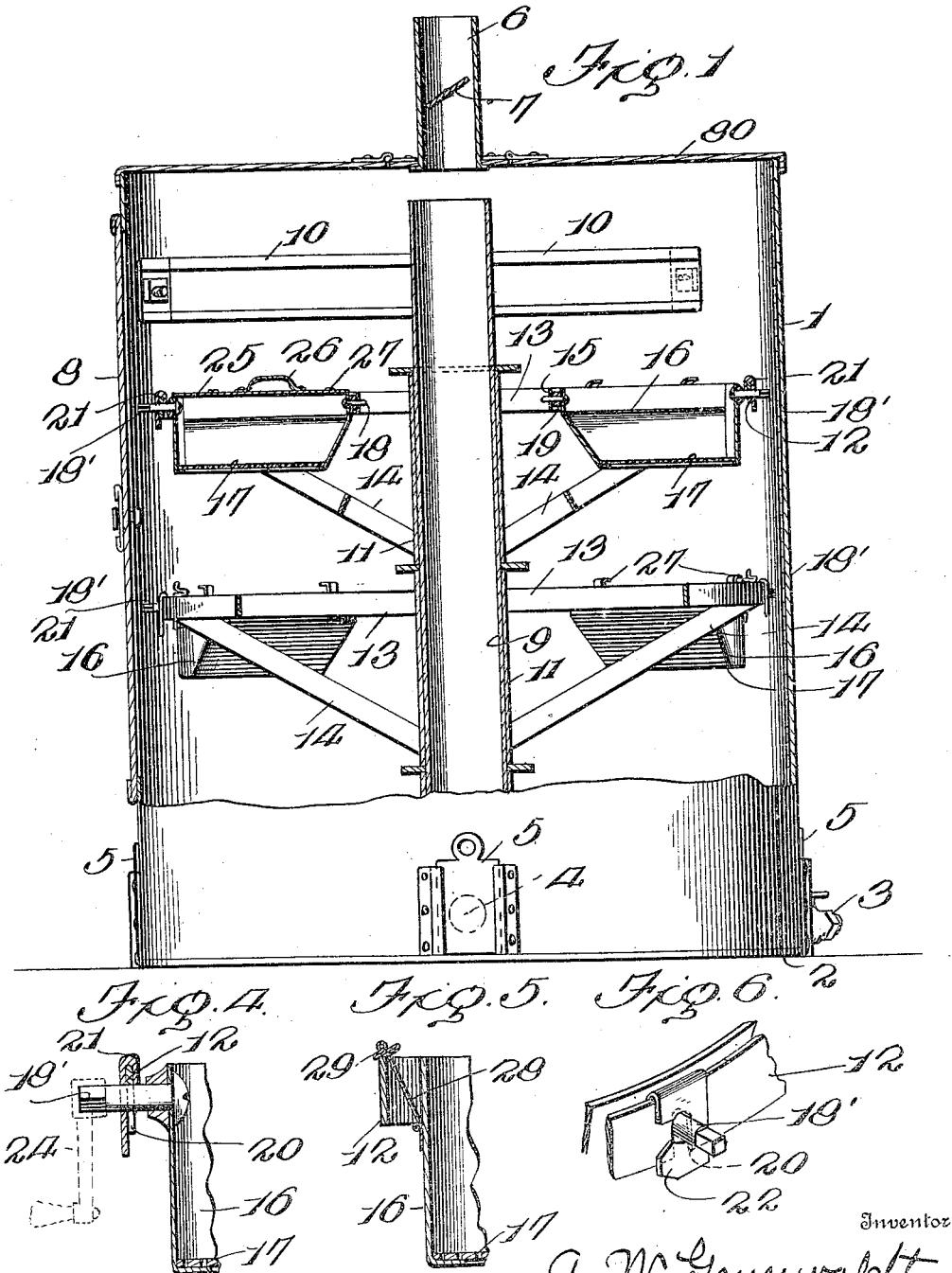

A. W. GRUNWALDT.
GRAIN GROWING APPARATUS.
APPLICATION FILED APR. 10, 1909.
946,033.
Patented Jan. 11, 1910.
2 SHEETS—SHEET 2.
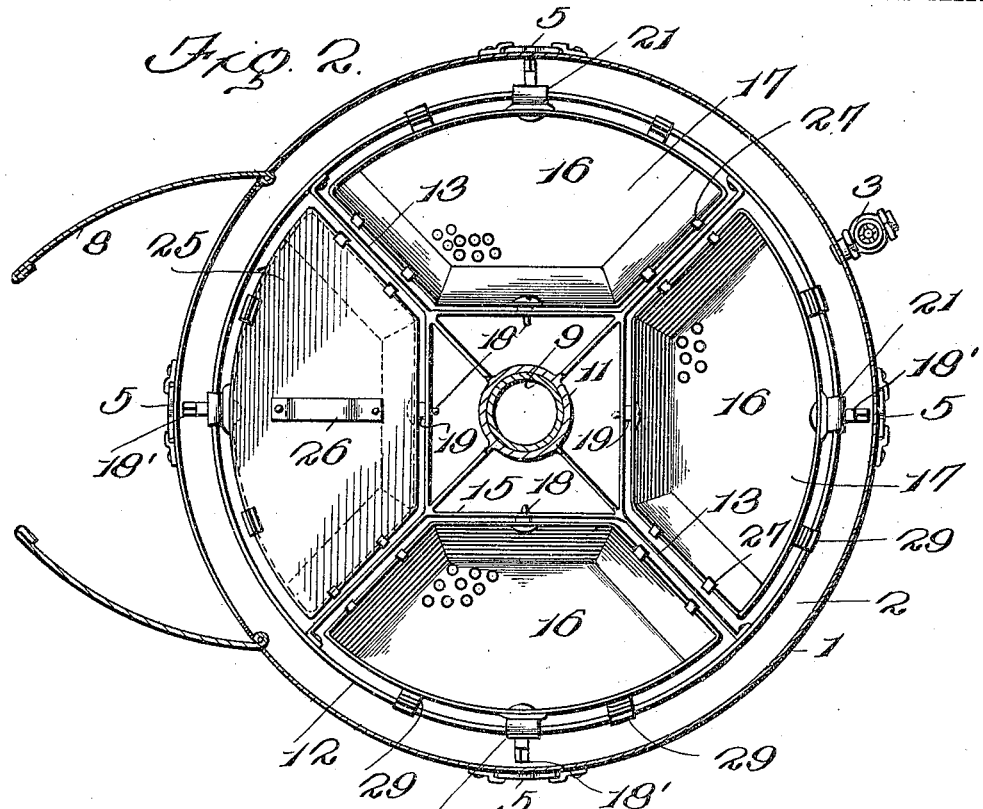
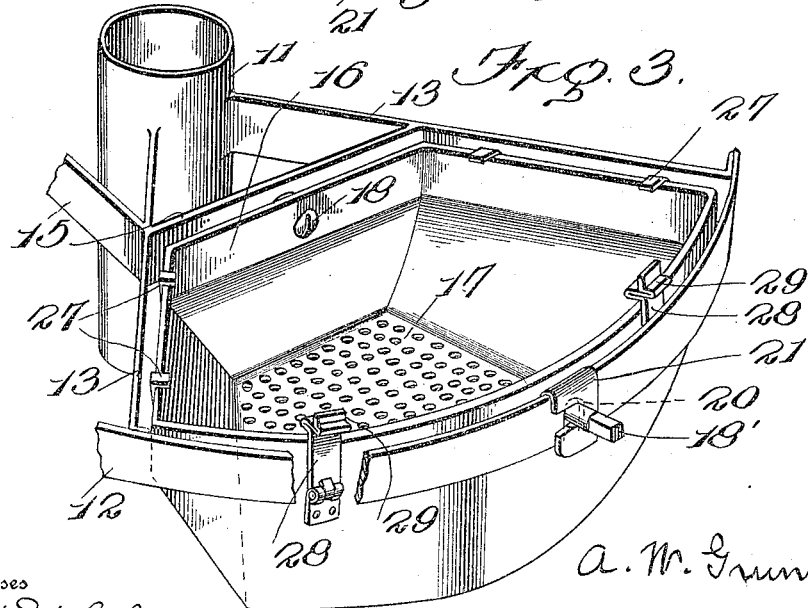

UNITED STATES PATENT OFFICE.

ALBERT W. GRUNWALDT, OF ABRAMS, WISCONSIN.

GRAIN-GROWING APPARATUS.

946,033.  Specification of Letters Patent.  Patented Jan. 11, 1910.

Application filed April 10, 1909.  Serial No. 489,098.

*To all whom it may concern:*

Be it known that I, ALBERT W. GRUNWALDT, a citizen of the United States, residing at Abrams, Oconto county, Wisconsin, have invented certain new and useful Improvements in Grain-Growing Apparatus; and I do hereby declare the following to be a full, clear, and exact description of the invention, such as will enable others skilled in the art to which it appertains to make and use the same.

This invention relates to certain improvements in grain sprouting apparatus, or what are sometimes termed "grain growers"; and the objects and nature of my invention will be readily understood by those skilled in the art in the light of the following description of the accompanying drawings illustrating what I now consider my preferred embodiment from among other formations and arrangements within the spirit and scope of my invention.

It is an object of my invention to provide improvements adapted for convenient use and operation by farmers, stock raisers, and others, without requiring skilled assistance and expensive power, steam or other plants, wherein the grain germinating and sprouting method can be carried on without constant attention, and the grain can be easily and readily stirred or agitated when necessary by manual operation.

A further object of the invention is to provide certain improvements in grain growers, whereby removable grain boxes can be employed in connection with means whereby said boxes can be easily and conveniently reversed or rotated for the purpose of stirring or agitating the grain therein.

The invention consists in certain novel features in construction and in combinations and arrangements of parts as more fully and particularly pointed out hereinafter.

Referring to the accompanying drawings: Figure 1, is a vertical longitudinal section through a grain grower embodying my invention. Fig. 2, is a cross section through the apparatus, one of the boxes being shown with a removable cover applied thereto and a hand crank for reversing the box, said particular box being arranged opposite an open side door of the casing so as to be accessible to the operator. Figs. 3, 4, 5, and 6, are detail sectional and perspective views illustrating the manner of mounting the boxes in the supporting frames or racks.

The grain growing apparatus illustrated, comprises a casing forming a germinating chamber provided with suitably controlled air inlets and outlets whereby the germinating temperature and humidity within the chamber can be maintained and controlled; suitable grain box carrying supports or racks being provided within the casing to receive removable grain boxes so mounted or supported within said racks as to be capable of rotation on horizontal axes for the purpose of stirring or agitating the grain within the boxes.

In the drawings, 1, is a suitable upright or vertical jacket, housing or casing designed to form an inclosed germinating chamber of the desired internal dimensions. This casing is usually formed with a closed floor 2, having a drain cock 3, for drawing off water accumulating on said floor. In the particular example illustrated, the casing is shown with a series of air inlet openings 4, arranged around its lower end and each provided with a regulating or controlling damper or slide 5, by which the openings can be closed or opened to a greater or less extent; and with a top air outlet pipe 6, having a controlling damper 7, by which the pipe can be closed and by which the outward passage of air can be controlled. I also show the casing formed with vertically swingable top covers or doors which are normally maintained closed, but which can be raised to increase the outflow of air from the casing or for other purposes. If so desired, the casing can be formed with a vertical side opening usually of such vertical length that all of the grain box racks will be arranged beside or opposite said opening so that the grain boxes will be readily accessible therethrough. This opening is normally closed by one or more horizontally swingable exterior doors 8, provided with any suitable means for normally holding the same tightly closed.

Within the casing, I arrange grain box racks supported by any suitable means and in any desirable manner. For instance, I show a fixed vertical post 9, centrally arranged within the casing and rising from the floor thereof and if so desired secured at the upper end by cross or radial braces 10. Any suitable number of grain box racks can be supported and centered on this post to rotate horizontally, said racks being arranged in a vertical series, one directly over the other, where more than one rack is employed. In the specific example illustrated, each rack is formed to receive several horizontally disposed grain boxes radially arranged with respect to the center post, and each rack comprises a center vertically elongated supporting hub or sleeve 11, embracing and turnable on the center post, a horizontal ring or annular frame 12, radial supporting arms 13, rigid with the hub and ring, and braces 14, rigid with the hub and arms and extending downwardly and inwardly from the outer portions of the arms to the lower end of the hub. As an example, for purposes of illustration, I show each rack formed to receive and carry four equally spaced grain boxes distributed around and radiating from the center post. The rack is constructed to provide a vertical opening for each box, each opening being surrounded by rigid portions of the rack forming a supporting frame around said opening and having its side portions formed by two adjacent rigid arms 13, its outer end by the portion of the ring 12, between the outer ends of said arms, and its inner end by a cross bar 15 between and rigidly secured to the inner portions of said two arms. Each grain box 16, is formed of any desired material and of any suitable shape and size for the purposes intended. Each box is of a size to receive a germinating charge of grain and to maintain the same during the process of germination and sprouting or growing, and usually all of the boxes are of the same size and shape and hence are interchangeable in the racks. In the specific example illustrated, each box is formed with closed sheet metal (or other suitable material) side and end walls, a reticulated or perforated sheet metal floor or bottom 17, and a normally open top. The floor is rigidly secured to the vertical walls and is formed to sustain the grain yet to permit excessive moisture to drain from the grain and drip through said perforated floor. The sides and inner end walls of each box can be inclined or beveled downwardly and inwardly if so desired, to permit rotation of the box without engaging adjacent portions of the supporting rack.

It is generally desirable that the racks removably support each box so that each box can be conveniently supplied with its charge of grain and then inserted in the casing onto a rack, and so that when the grain in a box has sprouted to the desired degree, the box can be removed from the rack and casing and emptied of its charge of sprouted grain. The grain in each box is sprinkled during the germinating process, and hence the boxes preferably are normally open at the top so that the grain therein is readily accessible for sprinkling and inspection. It is also necessary to stir or agitate the grain in each box during the process and heretofore this has been generally done by hand through the open tops of the boxes. This is often a disagreeable and objectionable method, and in the device shown in the drawings, I mount each box to turn or rotate on a horizontal axis and provide means for temporarily closing the open top of each box and for rotating the box while thus closed, so that the grain in the box will be agitated and stirred to the desired extent by turning the box over and over on a horizontal axis. Hence, I show each box supported in or hung from its supporting rack through the medium of front and rear horizontal projecting rigid pintles or shaft stubs 18, 18', usually arranged above the horizontal plane of the center of gravity of the box and both in the line of the longitudinal center of the box and rigid with the front and rear end walls of the box, respectively.

The portions 15 of the rack at the inner ends of the openings therein for the grain boxes, are provided with central transverse bearing openings or boxes 19, to removably receive the inner end pintles 18, of the boxes, while the portions of the ring 12, at the outer ends of said box receiving openings, are also provided with bearing openings to detachably receive the outer end pintles 18', of the boxes. In the specific example illustrated, said outer bearings are formed by vertical slots 20, opening at their ends through the edge of the ring 12, so that each box can have its inner pintle inserted lengthwise into a bearing opening 19, and the box can then be moved vertically so that its outer pintle will move laterally of ring 12, and into a slot 20 thereof. The outer end pintle can then be removably held in said slot 20, by a slide 21, hung on the ring 12 and movable longitudinally thereof and having a lateral hooked portion 22, to pass across the lower portion of slot 20, and under the outer pintle 18', and uphold the same in the slot so that said hook portion 22, forms the journal box or bearing for the outer pintle. Any box can thus be moved from its rack by slightly raising the outer end of the box and then moving its supporting slide 21, laterally from engagement with the outer end pintle, thereby permitting said pintle to drop free of slot 20 and the box can then be moved outwardly endwise from and below the rack.

The outer end pintles 18' of the grain boxes are usually squared or otherwise formed at their ends to detachably receive a hand crank 24, by which the boxes can be successively turned over and over or rotated vertically on a horizontal axis by hand, to agitate and stir the grain therein. A single crank 24 can be provided for each apparatus to be successively applied to the boxes, and also a single cover or top closure 25, can be provided for each apparatus, for successive application to the boxes thereof preparatory to rotating the same. The cover can be formed by a flat metal sheet of a size to cover a box and having a top handle 26. The cover is slipped from the front inwardly over the box top and under the hooks or catches 27, extending up from the sides of the boxes at their upper ends bent laterally and inwardly over the box top. Each box at its front end is provided with a catch for removably or detachably engaging the front end of the cover and holding the same on the box; and also for engaging the ring 12 to normally hold the box in its horizontal position and against tilting on its horizontal axis. For instance, I show the front end of each box provided with a pair of upwardly projecting stops or catches 28, arranged on opposite sides of the pintle 18', and each at its projecting upper end provided with a head 29, and at its lower end hinged or pivoted to the box front so that its upper end can swing toward and from the ring 12. In their normal positions the stops 28 are swung away from the box end with their heads 29, extending over and caught on the upper edge of the ring 12, and thereby holding the box against oscillation or rotation on its horizontal axis. When the cover is applied to a box, the stops are swung inwardly from the ring 12, so that their heads 29, lap and catch over the front end of the cover and thereby hold the front end of the cover in place. The box is thus released so that it can be oscillated or rotated in the rack by the hand crank or whatever other means may be provided for this purpose.

It is evident that various changes, variations, and modifications might be resorted to in the forms, constructions and arrangements of the parts described or that elements might be added or features omitted, without departing from the spirit and scope of my invention, and hence I do not wish to limit myself to the exact construction shown.

What I claim is:

1. A grain grower comprising independently rotatable open-top grain boxes, and means for covering a box during the rotation thereof, substantially as described.

2. A grain grower comprising a grain box support, and a series of independent grain boxes removably mounted therein to independently oscillate.

3. A grain grower comprising a grain box support and a grain box removably mounted therein to rotate on a horizontal axis and provided with a removable cover.

4. A grain grower comprising a grain box support, and a removable grain box provided with pintles adapted to carry said box in said support and on which said box is adapted to rotate.

5. In combination, a supporting rack, a series of grain boxes adapted to be removably supported in said rack, means for normally maintaining said boxes therein in normal position, and means whereby each box can be independently rotated in said rack for agitating the contents of the box.

6. In combination, a rack, and a series of independent grain boxes independently mounted in said rack for rotation on horizontal axes, substantially as described.

7. In combination, a rack, a series of normally open-top grain boxes mounted therein for independent rotation, and means for closing each box during rotation thereof.

8. In combination, an inclosure forming a chamber, a rack therein, series of grain boxes mounted in said rack to independently rotate on horizontal axes, and removable means for manually rotating each box separately.

9. In combination, a rack formed to removably and independently receive several independent grain boxes, each grain box having end pintles whereby the same is rotatably mounted in said rack, means detachably maintaining each box in normal position against rotation, and means whereby each box can be separately and removably closed for rotation.

10. In combination, a rack having a vertical opening to receive a grain box and provided with bearings at the ends of said opening to removably receive box supporting pintles, a normally open-top removable grain box having supporting pintles adapted to turn in said bearings, one of said pintles formed to receive means for rotating the box, a removable cover for said box, and means for detachably and normally maintaining said box in said rack against rotation, substantially as described.

11. In a grain growing apparatus, in combination, an inclosing casing forming a germinating-chamber, a series of independent grain boxes independently movably supported in said casing, means for normally maintaining each box in its normal upright position, and means for independently oscillating any box in said casing for agitating the contents thereof.

In testimony whereof I affix my signature, in presence of two witnesses.

ALBERT W. GRUNWALDT.

Witnesses:
ARTHUR BYNG,
JNO. SIEGLAIS, Jr.